(12) United States Patent
Bland et al.

(10) Patent No.: US 7,107,916 B2
(45) Date of Patent: Sep. 19, 2006

(54) METHOD FOR RECYCLING BUILDING MATERIALS

(75) Inventors: Brian W. Bland, Newark, OH (US); David R. Jones, IV, Tampa Bay, FL (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 0 days.

(21) Appl. No.: 10/805,815

(22) Filed: Mar. 22, 2004

(65) Prior Publication Data
US 2005/0126456 A1 Jun. 16, 2005

Related U.S. Application Data

(63) Continuation-in-part of application No. 10/226,051, filed on Aug. 22, 2002, now abandoned, which is a continuation-in-part of application No. 09/715,745, filed on Nov. 17, 2000, now Pat. No. 6,439,139.

(51) Int. Cl.
*F23B 7/00* (2006.01)

(52) U.S. Cl. .................... 110/346; 110/342; 110/345

(58) Field of Classification Search ............... 110/342, 110/343, 344, 345, 346, 347, 233; 432/14, 432/15; 414/449
See application file for complete search history.

(56) References Cited

U.S. PATENT DOCUMENTS

| | | | |
|---|---|---|---|
| 3,572,524 A | 3/1971 | Muckenheim | |
| 4,028,049 A | 6/1977 | Naudy et al. | |
| 4,081,285 A | 3/1978 | Pennell | |
| 4,179,263 A | 12/1979 | Jung et al. | |
| 4,295,823 A | 10/1981 | Ogawa et al. | |
| 4,330,340 A * | 5/1982 | Carlton | 106/281.1 |
| 4,387,653 A | 6/1983 | Voss | |
| 4,523,532 A | 6/1985 | Moriarty et al. | |
| 4,541,245 A | 9/1985 | Becker et al. | |
| 4,555,392 A | 11/1985 | Steinberg | |
| 4,571,137 A * | 2/1986 | Malmgren | 414/173 |
| 4,600,438 A | 7/1986 | Harris | |
| 4,640,681 A | 2/1987 | Steinbiss et al. | |
| 4,756,761 A | 7/1988 | Philip et al. | |
| 4,850,290 A | 7/1989 | Benoit et al. | |
| 5,031,549 A | 7/1991 | Collins, Jr. et al. | |
| 5,086,716 A | 2/1992 | Lafser, Jr. | |
| 5,163,374 A | 11/1992 | Rehmat et al. | |
| 5,347,938 A | 9/1994 | Takazawa | |
| 5,392,721 A | 2/1995 | Judd | |
| 5,454,333 A | 10/1995 | Von Seebach et al. | |
| 5,473,998 A | 12/1995 | Allen et al. | |

(Continued)

FOREIGN PATENT DOCUMENTS

JP 190712 * 10/1998

OTHER PUBLICATIONS

The Cement Industry, A History of Cement, www.portcement.org/indhist.htm.

(Continued)

*Primary Examiner*—Kenneth Rinehart
(74) *Attorney, Agent, or Firm*—Inger H. Eckert; James J. Dottavio

(57) ABSTRACT

A method of recycling building materials is described, including the steps of introducing the building material into a cement kiln or a boiler, and combusting a combustible portion of the building material as a fuel within the kiln or boiler. The noncombustible portion of the building material is incorporated into a clinker material within the kiln or used to reduce emissions form the boiler.

40 Claims, 2 Drawing Sheets

U.S. PATENT DOCUMENTS

| | | |
|---|---|---|
| 5,829,368 A | 11/1998 | Cote et al. |
| 5,833,474 A | 11/1998 | Kidd |
| 5,853,474 A | 12/1998 | Hilton |
| 5,888,256 A | 3/1999 | Morrison |
| 5,989,017 A | 11/1999 | Evans |
| 6,213,764 B1 | 4/2001 | Evans |
| 6,439,139 B1 * | 8/2002 | Jones .......................... 110/346 |

OTHER PUBLICATIONS

S. Kavidass & K.C. Alexander, Design Consideration of B&W Internal Circulation CFB Boilers, Power-Gen Americas '95.

* cited by examiner

METHOD FOR RECYCLING BUILDING MATERIALS

CROSS-REFERENCE TO RELATED APPLICATIONS

This application is a continuation-in-part of application, U.S. Ser. No. 10/226,051 filed Aug. 22, 2002 now abandoned which is a continuation-in-part of U.S. patent application Ser. No. 09/715,745, filed Nov. 17, 2000, now U.S. Pat. No. 6,439,139 all of which are incorporated by reference in their entirety.

BACKGROUND OF THE INVENTION

1. Field of the Invention

This invention is related generally to a method and apparatus for recycling building materials in as a supplemental fuel source and source of raw material(s).

2. Prior Art

Cement is produced by heating raw materials, forming a closely controlled chemical combination of calcium, silicon, aluminum, iron and small amounts of other ingredients. Common among the materials used in its manufacture are inorganic materials, such as limestone, shells, and chalk or marl combined with shale, clay, slate or blast furnace slag, silica sand, and iron ore. Lime and silica typically make up about 85% of the mass. The raw materials are heated in a cement kiln at high temperatures of typically 2600° F. to 3000° F. (1430° C. to 1650° C.). The inorganic minerals are "digested" in the kiln through a very complex set of chemical reactions, yielding oxides, and then finally complex silicates, which comprise the clinker. At 2700° F. (1480° C.), this series of chemical reactions cause the materials to fuse and create cement clinker-grayish-black pellets, often the size of marbles. Clinker is discharged red-hot from the lower end of the kiln in marble-sized pieces, and is transferred to various types of coolers to lower the clinker to handling temperatures. Cooled clinker is combined with gypsum and ground into a fine gray powder. The clinker is ground so fine that nearly all of it passes through a No. 200 mesh (75 micron) sieve. This fine gray powder is (termed) Portland cement.

The raw materials are placed in the high end and as the kiln rotates the materials move slowly toward the lower end. Natural Gas through Flame jets, and/or pulverized coal is feed in the lower end of the kiln to heat the materials in the kiln. Utilizing counter current flow, the kiln heat drives off, or calcines, the chemically combined water and carbon dioxide from the raw materials and forms new compounds (tricalcium silicate, dicalcium silicate, tricalcium aluminate and tetracalcium aluminoferrite). Of the material that goes into the feed end of the kiln, about 67% is discharged as clinker.

As described in U.S. Pat. No. 5,454,333, pumpable and solid hazardous wastes have been used a supplemental fuel to produce the heat for heating the mixture. Such wastes are typically used primarily for the heat value thereof.

U.S. Pat. No. 5,888,256, which is incorporated herein by reference, describes a process for using various waste fuel sources, analyzing the ash of each, and adjusting the raw material inputs for the cement based on the ash composition. Such wastes are previously known wastes used in such processes, such as sludge waste and such.

U.S. Pat. No. 5,888,256, which is incorporated herein by reference, describes a process for using various waste fuel sources, analyzing the ash of each, and adjusting the raw material inputs for the cement based on the ash composition. Such wastes are previously known wastes used in such processes, such as industrial waste sludge. The '256 patent requires a minimum of two waste streams, and blending and grinding to achieve a maximum 1000-micron particle size with a minimum BTU value and a maximum ash content. Accordingly, the '256 patent restricts the type and form of wastes which can be used.

U.S. Pat. No. 5,833,474 describes using waste materials from electric arc furnaces to supplement the input materials for cement to provide an inexpensive raw material, but not to recover fuel value therefrom.

Likewise, during combustion of organic materials, undesirable emissions typically occur, including $SO_x$ and $NO_x$. The level of such emissions may be affected by controlling the combustion temperature and adding calcium carbonate during combustion. A preferred means of accomplishing this includes the use of a fluidized bed boiler ("FBB"). In such a boiler, a bed is fluidized. This bed consists of fuel and lime added to the bed. $NO_x$ is generally lower in a FBB due to the relatively low temperature of the bed. As an added $NO_x$ control, secondary air can be used as overfire air to further control $NO_x$. The lime within the bed captures the $SO_2$ released from the burning fuel and reacts to form calcium sulfate (gypsum).

Asphalt shingles have been used extensively as a roofing material for the construction of buildings. In the process of making shingles, an organic or glass mat is coated with asphalt filled with limestone or dolomite, and inorganic granules are imbedded in the filled asphalt. Waste product from such an operation, or shingles removed from a house after their useful life, are sent to a landfill, due to the variety of materials used and the difficulty in separation of such materials. Often during the removal of old shingles form a house, nails used in the installation thereof, as well as rotten boards, tar paper, vents and other such materials are removed and sent with the shingles to the landfill. Furthermore, composite shingles have come into use in the recent past, an example of which is the Owens Corning Mira Vista®Shake, which comprises a filled polymeric shingle. Similar to the asphalt shingle, such a composite shingle may be recycled by combusting the polymeric material and using any filler materials therefrom as a component of the cement. Furthermore, other building materials such as siding materials, including asphalt siding, cedar siding, cementious siding and such, may be recycled in a similar manner.

It would be desirable to find an alternative disposal method for scrap building materials from the manufacturing process and building renovations, including asphalt shingles.

BRIEF SUMMARY OF THE INVENTION

According to the present invention, an improved recycling process is described to recycle building materials. As such, the disposal costs and landfill space for such materials are avoided. Furthermore, the energy value of such materials is recovered, and the inorganic constituents of the shingles or recycled building materials are incorporated and become part of the minerals useful in the manufacture of cement, and/or used as a material for reducing the emission of undesirable emissions, reducing the cost for these inputs in the manufacture of cement, or in the combustion process of a fluidized bed boiler.

Accordingly, a method of recycling building materials is described, including the steps of introducing the building material into a cement kiln or fluidized bed, and combusting a combustible portion of the building material as a fuel within the kiln or bed. The noncombustible portion of the building material is incorporated into a clinker material within the kiln, or utilized as a bed material and/or to reduce the sulfur emissions from combustion.

DETAILED DESCRIPTION OF THE PREFERRED EMBODIMENTS

Cement is produced by preparing the necessary raw materials in the necessary proportions and in the proper physical state of fineness and intimate contact so that chemical reactions can take place at the calcining and sintering temperatures in the kiln to form the end product, typically referred to as clinker. In general, the raw materials are crushed, passed through grinding, separation and mixing apparatuses and then introduced to a kiln.

As noted in the Background section, to reduce energy and raw material expense(s), numerous methods have been suggested to introduce waste materials in the kiln during the manufacture of Portland cement. U.S. Pat. No. 3,572,524 describes an apparatus for charging sludges and other similar waste materials to the feed end of a rotary incinerating kiln using an endless screw-conveyor. U.S. Pat. No. 4,850,290 to Benoit et al., describes a method for charging drums of solid hazardous waste directly into the central portion of a rotary kiln or into the feed end housing of a kiln. U.S. Pat. No. 5,454,333, describes a continuous feed method for various waste materials, such as tires or drums of hazardous waste, and describes various other methods for introducing solid hazardous waste fuels into the rotary kilns. These patents are incorporated herein by reference for such teachings.

Figure 1:
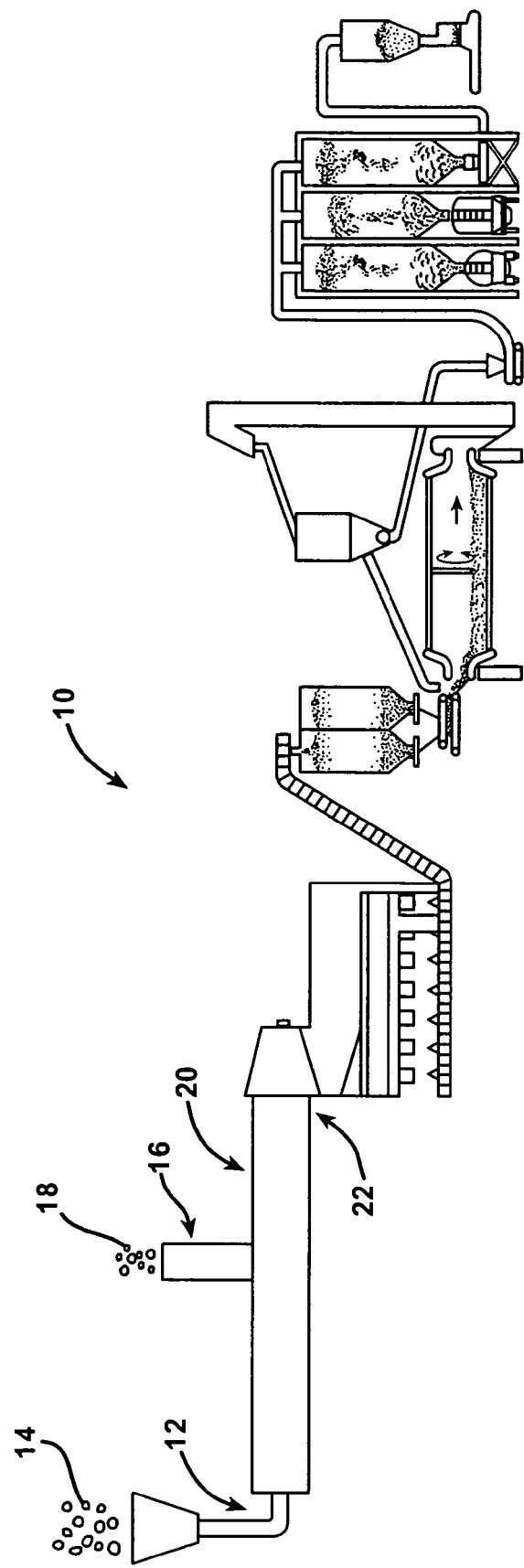
FIG. 1 is a schematic side view of a cement production facility using the present invention.

FIG. 1 gives a schematic overall diagram of a cement production apparatus 10. A kiln 20 includes an input end 12. Raw materials 14 are input into the input end 12 in a known manner. As taught in the prior art references, such input materials may enter into a precalciner kiln system prior to introduction into the kiln 20. The kiln 20 may optionally include a supplemental fuel introduction system 16, as described in the '256 patent. If so equipped, fuel 18 is introduced as described therein. As noted above, after the materials are calcinated, clinker is dispensed from the exit end 22 of the kiln and handled in a known manner. The material input system used with the present invention may include a number of systems as described in the prior art and are therefore not described herein in detail.

Scrap shingles, either the byproduct of the manufacturing process for roofing shingles, or shingles which are removed from an existing house, may be used as a fuel and raw material for the production of Portland cement. Such shingles include asphalt coating, which is useful as a fuel within the kiln. The asphalt coating includes filler materials, such as limestone, which is an input material for cement. The shingles further include a mat, made from either organic material, which is further useful as fuel, or a glass fiber mat. The glass fiber mat, when separated from the asphalt and granules within the kiln, provides a source of silica, which is another input material for the cement. The silica is then combined with the other cement inputs within the kiln, and is formed into the clinker. Normally, shingles include granules, which provide further crushed and screened minerals, which provide additional inputs for the concrete. Fiberglass asphalt shingles typically comprise about 20% asphalt, 2% glass fiber, 65% limestone, and the balance comprises various materials, mostly minerals.

When a roof is stripped of shingles, additional building materials, such as roofing underpayment (frequently asphalt coated glass or organic mat), rubberized sheeting (ice guard), nails, wood from the roof deck, roof vents, and other materials are also removed and discarded with the shingles. The nails provide iron, another input to the cement; while the felt may provide fuel and glass; while the wood provides additional fuel for the kiln. As such, scrap shingles provide several inputs to the cement manufacturing process, as both fuel and raw materials, unlike other previously proposed waste materials. As such, preferably the mixture of inputs to the cement manufacturing process is determined and modified in a manner as described in the '256 patent to create the desired clinker formulation.

Preferably, the building materials, including the shingles, may be introduced without grinding into the raw material hopper (12), and the rotating kiln. Within the kiln, combustion of the organics destroys the structure of the shingles and other building materials, and the remaining inorganic materials are fully incorporated into the clinker within the kiln. However, depending on the feed system, it may be desirable to mill or grind large input materials in some instances.

In a similar manner, natural shingles, such as cedar shakes, may be disposed as a fuel source in a cement kiln. Furthermore, composite shingles have come into use in the recent past, an example of which is the Owens Corning Mira Vista®Shake, which comprises a filled polymeric shingle. Similar to the asphalt shingle, such a composite shingle may be recycled by combusting the polymeric material and using any filler materials therefrom as a component of the cement.

Furthermore, other building materials may be recycled in a similar manner, using the fuel value of the materials in the cement kiln, while using the noncombustible components as additional raw materials for the cement. Examples include siding materials, such as vinyl siding, asphalt siding, cedar siding, cementious siding and such, may be recycled in a similar manner. Likewise, fiberglass insulation may be recycled by placing such within the kiln, and although mostly noncombustible, provides silica and other inorganic constituents for the cement.

Figure 2:
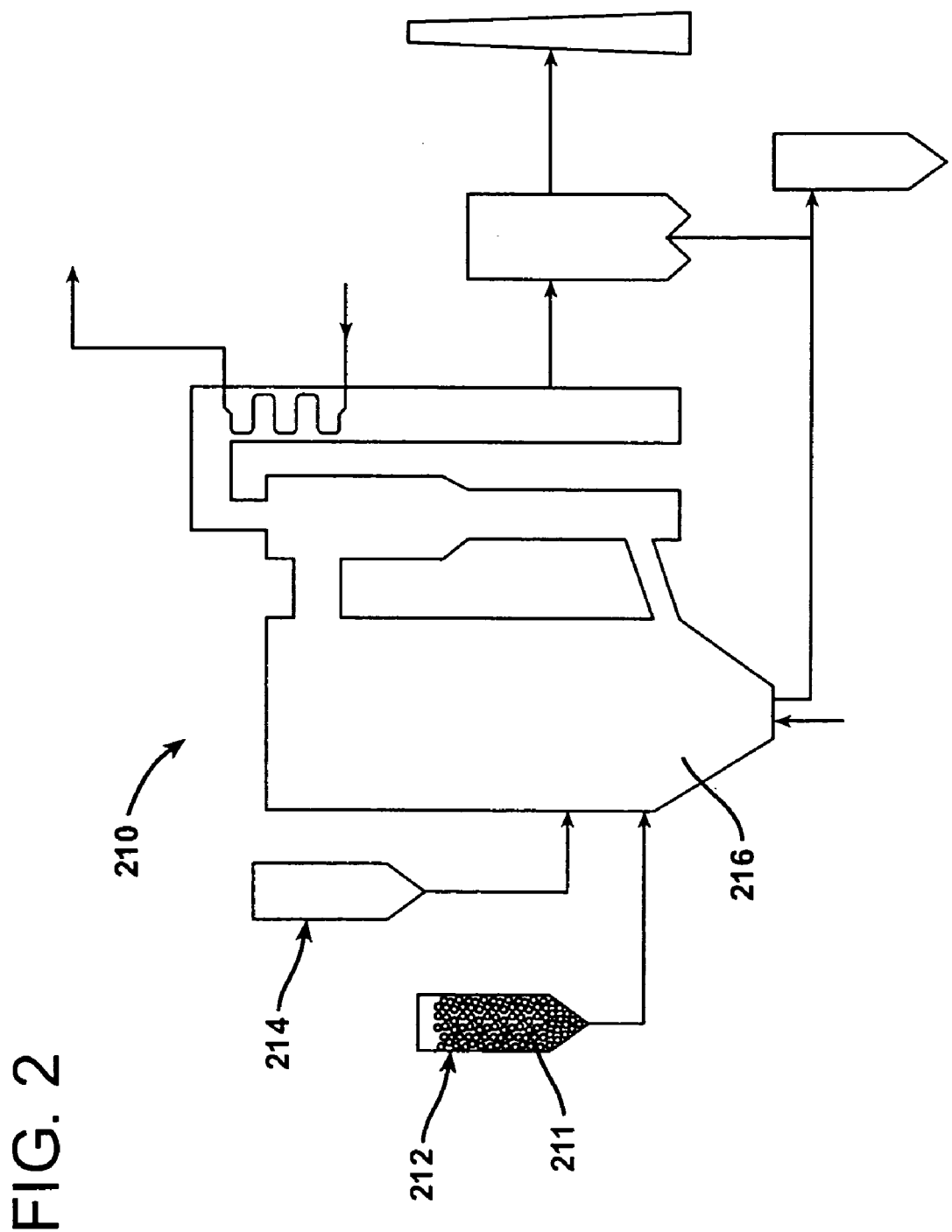
FIG. 2 is a schematic side view of a fluidized bed boiler using the present invention.

FIG. 2 schematically illustrates a fluidized bed boiler 210. Such a boiler may comprise a bubbling bed, circulating fluidized bed, or any known fluidized bed. In such a boiler, fuel 211 is fed from a feed source 212, and limestone is fed from a second source 214 into the bed 216 as an emissions reduction material. In such fluidized bed combustion, fuel is introduced into the fluidized bed 216 and combusted. The fluidization is achieved by blowing relatively low-velocity air into a medium such as sand. Lime is injected into the bed 214. The present invention may be used in a variety of fluidized beds, and therefore they are not described herein in great detail. An exemplary description of a fluidized bed boiler and its operation is included in *Design Considerations of B&W Internal Circulation CFB Boilers* by Kavidass and Alexander, presented to Power-Gen Americas '95, Dec. 5–7, 1995, which is incorporated herein by reference. In the instant invention, the building materials are fed into the fluidized bed, and the organic portion of the building materials is combusted.

Typically a CFB utilizes fuels having between 3500 and 7000 British Thermal Units per pound (BTU/lb), and inject limestone in an amount of about 20% by weight of the fuel. When asphalt shingles are so combusted in a CFB, the fuel value comprises about 4200 British Thermal Units per pound (BTU/lb) (primarily from the asphalt coating), and contain about 30–40 percent limestone (calcium carbonate primarily from the asphalt coating filler), as well as other inorganic materials such as the glass mat and colored granules. In such an application, the shingles would preferably comprise a portion of the fuel and a second fuel, preferably with higher BTU value and lower lime percentage, is used to optimize combustion and emissions. When asphalt shingles are combusted, the asphalt from the shingles is combusted, the limestone is used within the bed to control gases such as SOx and NOx, and the granules and such are added to the bed as particulate bed material. During operation of the bed while feeding these or other such building materials, the amount of limestone and bed material is adjusted based on the amount of each contained in the building materials, as described above with respect to asphalt shingles. Additionally, in a roof tear-off situation, wood and tar paper and/or other building materials will contribute additional energy value as well as inorganic bed materials, as is the case where other building materials, such as siding, are combusted.

Preferably when building materials such as shingles are combusted, a grinder, such as a Packer 2000 manufactured by Packer Industries of Mableton, Ga., is used to reduce the size of the shingles to pieces of preferably less than 3 inches in any dimension. Preferably, the ground shingles are then fed into a hammer mill with other combustion materials to reduce the size to less than ½ inch in any dimension. In one trial at the Colmac Resources, Inc. Piney Creek power plant in Clarion, Pa., scrap shingles and manufacturing waste from Owens Corning's Medina, Ohio shingle plant were ground and fed into a of waste coal at a ratio of about 10% shingle scrap to total fuel. The ground shingles and waste coal were hammered and fed into a CFB, and the flow rate of the feed limestone dropped over 3% (from the typical 20%) to below 17% by weight of fuel due to the lime content of the shingles. Accordingly, in this example, the shingles provided 15% of the total lime required to maintain the emissions, and the mixed fuel burned acceptably and emissions were within permissible limits. One skilled in the art appreciates that the lime feed system may be adjusted based on the amount and type of filler in the shingles (or other building material) in combination with the percentage of shingles to other fuels fed into the boiler, as well as the amount of sulfur in the fuels, acceptable emissions limits, and other control mechanisms on the boiler. Similarly, when other building materials are combined with the fuel stream, the fuel value, lime content, and filler content may used to adjust the stream of fuel, lime and bed materials into the fluidized bed to an appropriate ratio.

As noted above, fluidized bed combustion primarily consists of the bubbling type and the circulating type. In the bubbling type, because the velocity of the air is low, the medium particles are not carried above the bed. In the circulating type, the velocity of air is high, so the medium particles are carried out of the combustor. The carried particles are captured by a cyclone installed in the outlet of combustor.

In the bubbling type, combustion is generated within the bed. In the circulating type, combustion is generated in the whole combustor with intensive movement of particles. Typically secondary air is added above the bed to minimize the excess air during primary combustion so as to minimize the generation of pollutants. In such a CFB, particles which leave the bed are continuously captured by the cyclone and sent back to the bottom part of the combustor to combust unburned particles and maintain the bed.

As described above, the input materials are fed into the bed, the combustible portion, such as asphalt from roofing shingles, is combusted, and the noncombustible portion remains. In the present invention, the filler (lime) from the shingles is then used within the bed as an input material to react with the sulfur and reduce emissions. The remaining inorganic materials may become part of the bed as well.

The embodiments were chosen and described to provide the best illustration of the principles of the invention and its practical application to thereby enable one of ordinary skill in the art to utilize the invention in various embodiments and with various modifications as are suited to the particular use contemplated. Also such modifications and variations are within the scope of the invention as determined by the appended claims when interpreted in accordance with the breadth to which they are fairly, legally and equitably entitled

What is claimed is:

1. A method of recycling building materials comprising a shingle into a fuel and useful residue material, comprising the steps of:
   introducing the building materials into a combustion chamber;
   combusting an organic portion of the shingle comprising an asphalt material from a glass substrate of the shingle; and
   using an inorganic portion of the shingle comprising a filler in said asphalt as an emissions reduction material in a boiler.

2. A method according to claim 1, wherein said method comprises feeding said shingle into as a fuel to a fluidized bed boiler having a fuel feed system and a lime feed system, and wherein the amount of lime fed into the boiler is reduced based on the amount of lime in the asphalt filler.

3. A method according to claim 1, wherein the asphalt is filled with a limestone or dolomitic material and the limestone or dolomitic material provides a source of lime to reduce an amount of sulfur emissions from the boiler.

4. A method according to claim 3, wherein the shingle further comprises surface granules, said granules providing a source of bed material in said boiler.

5. A method according to claim 4, wherein said shingle comprises scrap from the manufacture of roofing shingles.

6. A method according to claim 1, wherein said shingle is removed from a building along with further building materials selected from the group consisting of nails, wood, felt paper, ice shield, and roofing accessories, and wherein each of said further building materials provides fuel or bed materials for said boiler.

7. A method according to claim 1, wherein the shingle further comprises an asphalt filler and wherein said shingle comprises surface granules, said granules providing a source of lime or as an emissions reduction material in a boiler.

8. A method according to claim 1, wherein the shingles comprising surface granules and asphalt with a filler, the method further comprising the steps of:
   combusting said asphalt from a glass substrate of the shingle; and
   incorporating a noncombustible portion of the shingle in a bed of the boiler as an emissions reduction material.

9. A method according to claim 1, wherein the shingle comprises a filled resinous material, the recycling process further comprising the steps of:

combusting a resin from a filler material of the shingle; and using said filler as an emissions reduction material in a boiler.

10. A method according to claim 1, further comprising:

removing the building materials from a building before introducing the building materials into a cement kiln or a boiler.

11. A method according to claim 10, wherein the building materials comprise siding.

12. A method of recycling a shingle into a fuel and useful residue material, comprising:

introducing the shingle into a combustion chamber of a fluidized bed boiler having a fuel feed system and a lime feed system;

combusting an asphalt material from a glass substrate of the shingle as a fuel within the combustion chamber; and using a filler in said asphalt as an emissions reduction material in the boiler, wherein an amount of lime fed into the boiler is reduced based on an amount of lime in the asphalt filler.

13. A method of recycling asphalt shingles having a filler material, comprising:

introducing the shingles into a fluidized bed boiler having a system for feeding an amount of lime into the boiler, combusting the asphalt from said shingles as a fuel in said boiler;

using said filler material to reduce emissions from said boiler,wherein the amount of lime is reduced based on the amount of lime in the shingles.

14. A method of recycling asphalt shingles having a filler material, comprising:

introducing the shingles into a fluidized bed boiler having a system for feeding an amount of lime into the boiler, combusting the asphalt from said shingles as a fuel in said boiler;

using said filler material to reduce emissions from said boiler, wherein the amount of lime is reduced based on the amount of shingles fed into the boiler as fuel.

15. A method of recycling asphalt shingles having a filler material, comprising:

introducing the shingles into a fluidized bed boiler having a system for feeding an amount of lime into the boiler, combusting the asphalt from said shingles as a fuel in said boiler;

using said filler material to reduce emissions from said boiler, wherein the amount of lime fed from the lime feed system is reduced by at least five percent due to the filler material.

16. A method of recycling asphalt shingles having a filler material, comprising:

introducing the shingles into a fluidized bed boiler, said boiler combusting an amount of fuel, combusting the asphalt from said shingles as a part of said amount of fuel in said boiler;

using said filler material to reduce emissions from said boiler, wherein an amount of lime fed into the boiler comprises at least live percent by weight of the fuel, and wherein the shingles contribute at least ten percent of said lime.

17. A method of recycling asphalt shingles having a filler material, comprising:

introducing the shingles into a fluidized bed boiler, said fluidized bed boiler comprises a system for feeding an amount of lime into the boiler, combusting the asphalt from said shingles as a part of said amount of fuel in said boiler;

using said filler material to reduce emissions from said boiler, wherein the amount of lime fed from the lime feed system is reduced by at least five percent due to the filler material.

18. A method according to claim 17, wherein the amount of lime fed from the lime feed system is reduced by at least fifteen percent due to the filler material.

19. A method according to claim 17, wherein the boiler combusts an amount of fuel, and wherein the bed includes approximately twenty percent lime by weight of the fuel, and wherein the asphalt contributes at least one of said approximately twenty percent lime.

20. A method according to claim 17, wherein the asphalt contributes at least approximately three of said approximately twenty percent lime.

21. A method according to claim 20, wherein said asphalt comprises at least approximately ten percent of said fuel.

22. A method according to claim 20, wherein said asphalt comprises asphalt shingles, and wherein said asphalt shingles comprise at least approximately ten percent by weight of said fuel.

23. A method of recycling building materials having a combustible portion and a noncombustible portion into a cement material, comprising:

introducing the building materials into a cement kiln;

combusting the combustible portion of the building materials as a fuel; and incorporating the noncombustible portion of the building materials into a clinker material wherein an organic portion of the building materials is combusted and an inorganic portion of the building materials is incorporated into the clinker material, wherein the building materials comprises a shingle, the recycling process further comprising the steps of: combusting an asphalt material from a glass substrate of the shingle; and incorporating said substrate into said clinker material as a source of minerals for said cement material.

24. A method according to claim 23, wherein said substrate further comprises silica and useful elements comprising Calcium and Aluminum which are incorporated into said clinker material as a source of minerals for said cement material.

25. A method according to claim 23, further comprising:

removing the building materials from a building before introducing the building materials into a cement kiln.

26. A method according to claim 25, wherein the building materials comprise siding.

27. A method of recycling building materials comprising shingles having a combustible portion and a noncombustible portion into a cement material, comprising:

introducing the shingles into a cement kiln;

combusting an asphalt portion of the shingles from a glass substrate of the shingles as a fuel; and incorporating said substrate and a limestone or dolomitic filler material from the asphalt as a source of minerals, including calcium and magnesium from said filler, in said cement material.

28. A method according to claim 27, wherein the shingle further comprises surface granules, said granules providing a source of minerals in said cement.

29. A method according to claim 28, wherein said shingle comprises scrap from the manufacture of roofing shingles.

30. A method of recycling building materials comprising a shingle into a cement material, comprising:

removing the building materials, including the shingle, from a building along with further building materials selected from the group consisting of nails, wood, felt paper, ice shield, and roofing accessories;

introducing the building materials into a cement kiln;

combusting an asphalt material from a glass substrate of the shingle as a fuel and incorporating said substrate into said clinker material as a source of minerals for said cement material;

combusting a combustible portion of the further building materials as a fuel; and incorporating the noncombustible portion of the building materials into a clinker material, wherein each of said further building materials provides fuel or raw materials for said cement material.

31. A method according to claim 30, wherein the asphalt is filled with limestone or dolomite and the limestone or dolomite provides a source of calcium and magnesium in said cement.

32. A method according to claim 31, wherein the further building materials comprises nails and wherein said nails provide iron for said cement.

33. A method according to claim 32, wherein said shingle further comprises surface granules, said granules providing a source of minerals in said cement.

34. A method of recycling building materials comprising shingles having a combustible portion and a noncombustible portion into a cement material, the shingles, further comprising surface granules, the method compromising:

introducing the shingles into a cement kiln;

combusting the combustible organic portion of the shingles as a fuel, wherein the shingles comprise asphalt and wherein the receiving process further comprising the steps of combusting said asphalt and an organic substrate of the shingles; and incorporating the noncombustible inorganic portion of the shingles into a clinker material, said granules providing a source of minerals in said cement.

35. A method according to claim 34, wherein the shingle further comprises a filler material in said asphalt and wherein filler providing a source of minerals in said cement.

36. A method of recycling building materials comprising shingles having a combustible portion and a noncombustible portion into a cement material the building materials comprising a shingle including a filled asphalt, The recycling process further comprising the steps of:

introducing the shingles into a cement kiln;

combusting said asphalt from a glass substrate of the shingle as a fuel; and incorporating the noncombustible portion of the shingles into a clinker material, comprising incorporating said substrate into said cement material as a source of silica.

37. A method of recycling building materials comprising a shingle including a mineral-filled asphalt and a filler material into a cement material, the method comprising:

introducing the shingle into a cement kiln;

combusting the asphalt as a fuel; and incorporating the filler material of the asphalt as a source of lime, and a glass mat as a source of silica, into a clinker material.

38. A method of recycling asphalt shingles according to claim 37, further comprising the step of incorporating a surfacing granule as a source of minerals into a clinker material.

39. A method according to anyone of claims 1, 34, 35 and 36 wherein the shingles or building materials are introduced in the combustion chamber or kiln through a precalciner and wherein the step of combusting the building materials, shingles, combustible organic portion of the shingles, resin from a filler material of the shingle or asphalt material from a glass substrate comprises combusting the combustible portion of the building materials, combustible organic portion of the shingles, resin from a filler material of the shingle or a portion of the asphalt within the precalciner.

40. A method according to any one of claims 1, 34, 35 and 36 wherein the step of combusting the building materials, shingles, combustible organic portion of the shingles, resin from a filler material of the shingle or an asphalt material from a glass substrate comprises combusting the building materials, shingles, combustible organic portion of the shingles, resin front a filler material of the shingle a portion of the asphalt within the kiln.

* * * * *

UNITED STATES PATENT AND TRADEMARK OFFICE
CERTIFICATE OF CORRECTION

| | | |
|---|---|---|
| PATENT NO. | : 7,107,916 B2 | Page 1 of 1 |
| APPLICATION NO. | : 10/805815 | |
| DATED | : September 19, 2006 | |
| INVENTOR(S) | : Bland | |

It is certified that error appears in the above-identified patent and that said Letters Patent is hereby corrected as shown below:

Claim 34, Column 9, Line 33 - should read --recycling process--
Claim 40, Column 10, Line 40 - should read --from a filler material--

Signed and Sealed this

Nineteenth Day of December, 2006

JON W. DUDAS
*Director of the United States Patent and Trademark Office*

Disclaimer 7,107,916—Brian W. Bland, Newark, OH; David R. Jones, IV, Tampa Bay, FL. METHOD FOR RECYCLING BUILDING MATERIALS. Patent dated Sep. 19, 2006. Disclaimer filed Oct. 08, 2009, by the assignee, Owens Corning Fiberglas Technology, Inc.

Hereby disclaims the entire remaining term of Patent No. 7,107,916.

(*Official Gazette* May 24, 2011)